INVENTOR.
WILLIAM HENRY CROSWELL

United States Patent Office 3,163,195
Patented Dec. 29, 1964

3,163,195
LOCK NUT DEVICES
William Henry Croswell, Columbus, Ohio, assignor to Ranco Incorporated, Columbus, Ohio, a corporation of Ohio
Filed Feb. 15, 1962, Ser. No. 173,464
1 Claim. (Cl. 151—7)

This invention relates to improvements in lock nut devices and more particularly to improved nut devices which cooperate with spring tension adjusting screws rotatable to adjust the operating characteristics of control mechanisms, such as thermostatic or pressure operated switches and the like, and which devices prevent rotation and consequent shifting of the operating characteristics due to vibration, etc.

A common practice in control mechanism construction is to employ a tension spring between a movable arm and the frame of the mechanism with one end of the spring secured by an adjustable anchoring means in the form of a screw extending loosely through the arm or the frame and threadedly engaged in a plate or nut member lodged in the end convolutions of the spring so that rotation of the screw in the nut member will lengthen or shorten the spring to vary the tension on the movable arm and hence vary the operating characteristics of the control mechanism. Such an arrangement is disclosed in United States Patent No. 2,808,478, entitled Control Apparatus. Because control mechanisms, such as switches and the like, are often subjected to shock and vibration due to their association with motors, etc., and due to snap acting characteristics of the control mechanisms, it has been difficult to prevent undesired rotation of the screw and loss of adjustment while still permitting rotation of the screw by use of a screw-driver or other hand tool to accomplish fine adjustment of the spring tension.

It is a principal object of this invention to provide an improved nut device for cooperation with a screw, which nut device is self locking on the threads of the screw so as to inhibit undesired relative rotation between the screw and the nut member and to frictionally resist such rotation by rotational forces below a predetermined value such as may occur by reason of shock, vibration, and the like.

Another object of this invention is the provision of a nut device which offers substantially constant frictional resistance to rotation of a screw therein regardless of the direction of rotation of the screw.

Still another object of this invention is the provision of a nut device which offers substantially constant frictional resistance to rotation of a screw therein regardless of the position of the nut device along the length of the screw thread.

A more specific object of the invention is the provision of a locking device for a screw or the like comprising a resilient thread gripping member or washer held against rotation and in a manner to permit it to flex in a direction axially of a central opening therethrough and which is formed of material softer than the screw, the opening through the washer being smaller than the diameter of the screw so that by forcing the screw axially into the opening while rotating the same the washer is flexed and screw threads are cut therein by the screw while the washer is flexed, whereby after the axial force on the screw is relieved the washer tends to flex to its normal position and in doing so causes a constriction of the threaded opening to grip the screw and resist rotation thereof. Preferably, the washer is supported about its edges by a part of a threaded member which receives the screw and to which it is desired to lock the screw.

Other objects and advantages of nut devices embodying this invention will become apparent from the following detailed description of a preferred example thereof read in conjunction with the accompanying sheet of drawings forming a part of this specification, and in which.

Figure 1:
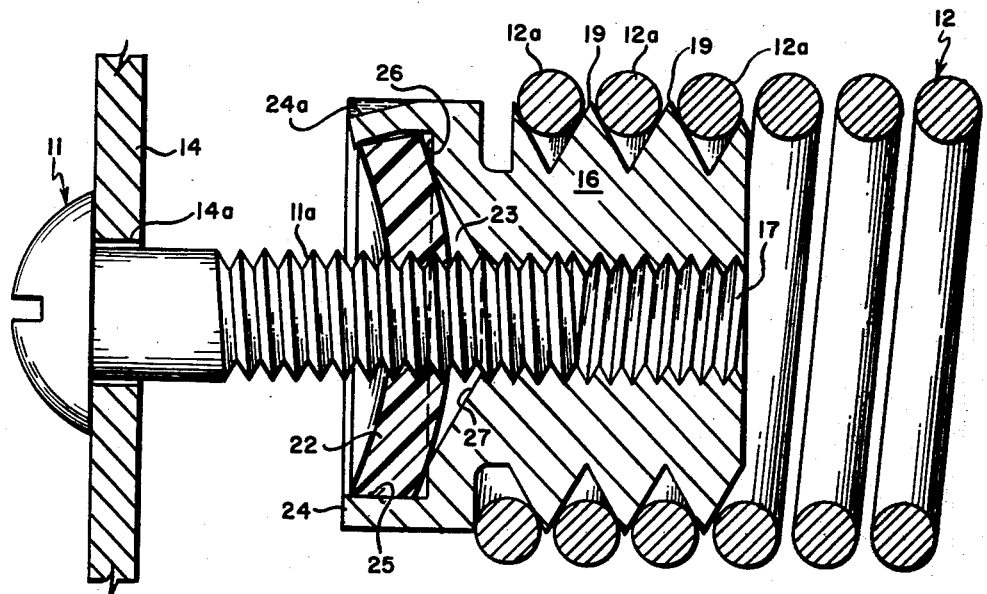
FIG. 1 is a longitudinal sectional view of a nut device embodying this invention as applied to the adjustable anchoring of a tension spring.
Figures 2, 3:
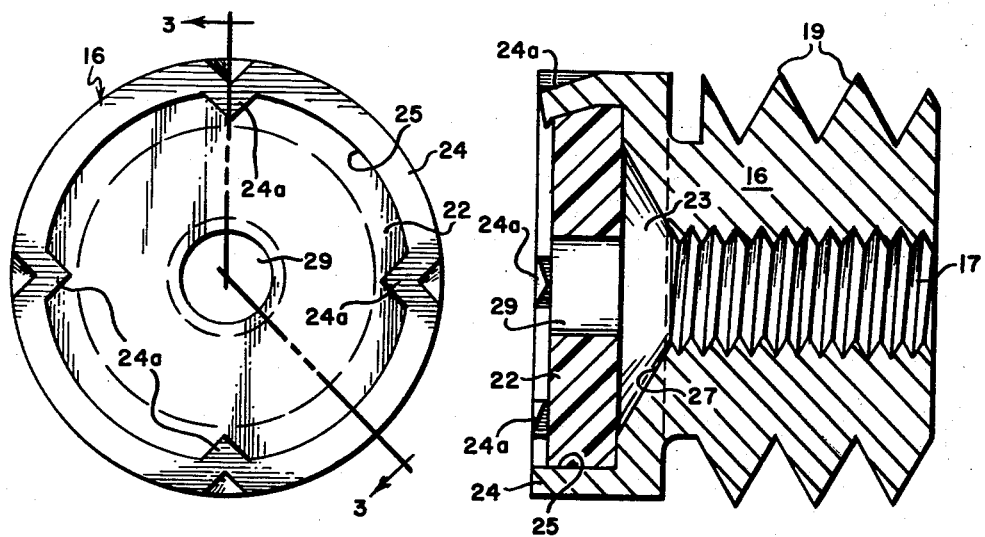
FIG. 2 is an end view of the nut device only of FIG. 1.
FIG. 3 is a sectional view of the nut device taken substantially along line 3—3 of FIG. 2.

In the form of the invention illustrated in the drawings, a self locking nut device, generally indicated at 10, is shown in association with a screw 11 to form an adjustable anchoring means between one end of a tension spring 12 and a stationary member such as a wall 14 of a control mechanism (not shown). Nut device 10 comprises a nut member 16 having an internally threaded central bore 17 and having external threads 19 adapted to be lodged in the end convolutions 12a of coil spring 12.

Screw 11 has a threaded shank 11a extending loosely through an opening 14a in wall 14 and threadedly received in threaded bore 17 as shown in FIG. 1. Rotation of screw 11 in one direction or the other with respect to nut device 10 will cause the latter to move along shank 11a to increase or decrease the tension of spring 12. This above described anchoring arrangement finds use in control mechanisms such as thermostatic switches and the like wherein the changes in tension in a spring such as 12 are utilized to vary the operating characteristics of the control mechanism. One example of a mechanism using such an anchoring arrangement is found in the previously mentioned U.S. Patent No. 2,808,478. Such mechanisms are subject to shock, vibration, and the like during operation thereof, sometimes resulting in inadvertent rotation of anchoring screw 11 and disturbance of the setting of the operating characteristics of the switch or other mechanism.

The nut device 10 of this invention comprises a self locking feature which frictionally resists undesired rotation of a screw therein regardless of the position of the nut device along the screw thread or of the direction of rotation of the screw, while still permitting fine adjustment by rotation of the screw with a suitable tool such as a screw-driver. To this end nut device 10 comprises a screw thread gripping resilient member which is shown in the form of a washer 22 disposed in a cavity 23 formed in one end of nut member 16. Cavity 23 is defined in part by an annular wall 24 having an inner cylindrical surface 25 extending axially from a radially extending annular surface or shoulder 26 lying in a plane perpendicular to the axis of the nut. Cavity or counterbore 23 is further defined by a frusto-conical sloping surface 27 leading from the inner edge of annular surface 26 to the open end of internally threaded bore 17.

Resilient washer 22 is normally flat and is disposed against the radially extending annular wall 26 and surrounded by cylindrical surface 25. Wall 24 is staked inwardly at a plurality of places as at 24a to secure washer 22 against rotation with respect to nut member 16. Resilient washer 22, which is preferably formed of a suitable plastic material such as "Nylon" or the like which is softer than the screw to be used, is provided with a central aperture 29 the diameter of which is less than the major diameter of internally threaded bore 17 and preferably no greater than the minimum diameter of the internally threaded bore.

Frusto-conical surface 27, which slopes away from washer 22, permits deflection of the center portion of the washer when a screw is pressed axially thereagainst and rotated into opening 29 so as to form its own thread therein. When the nut device 10 is being assembled with a screw such as 11, the washer 22 is flexed out of its normal plane and toward wall 27 by axial pressure on the screw toward the nut member until the threads of the screw engage the threaded interior of the bore 17. Thereafter, washer 22 tends to return to its normal plane and exerts an axial force on the threads of the screw in a direction outwardly of the nut member as well as a constricting force on the screw. The constricting force is the combined effect of an inward component of force resulting from angular displacement of the washer as shown in FIG. 1, and from radial compression of the material of the washer around opening 29 thereof.

The axial and constricting forces exerted by washer 22 against the threads of screw 11, as the washer tends to resume its normal plane, creates substantial frictional resistance to rotation of the screw with respect to nut device 10, and this frictional resistance is substantially constant regardless of the position of the nut device 10 along the threaded shank 11a and regardless of the direction of rotation of the screw 11. Moreover, the frictional resistance offered by the axial force applied by washer 22 is independent of, and in addition to, any frictional effects resulting from radial compression of the washer material as the screw formed threads therein.

From the foregoing detailed description of a lock nut device 10 embodying the present invention, it will be appreciated that there has been provided thereby a particularly effective self locking nut device which offers a substantially constant resistance to relative rotation between the device and a screw assembled therewith by utilization of a resiliently flexible washer which is axially displaced upon assembly of a screw therewith, and which washer thereafter provides axial and radial forces on the threads of the screw which inhibit rotation thereof. It will also be appreciated that the lock nut devices of this invention are particularly useful in applications wherein the nut device is not drawn up tight against any structure to be clamped thereby.

Although the invention has been described in considerable detail, and with reference to a specific self locking nut device embodying the invention, it will be understood that the invention is not limited thereto, but rather the invention includes all those adaptations, modifications and uses as are reasonably embraced by the scope of the claim hereof.

Having thus described my invention, I claim:

A self locking nut and screw device comprising in combination:

(a) a nut member having an internally threaded bore for receiving a screw and having an external thread means, (b) said nut member having a recess in one end thereof defined in part by a cylindrical wall portion extending axially from a radially extending annular surface, said radially extending surface being substantially perpendicular to the nut axis, and a frusto-conical surface between the inner edge of said annular surface and the edge of said bore, said frusto-conical surface being inclined toward the other end of said nut, (c) a flat, non-metallic resilient washer disposed against said annular surface and encircled by said cylindrical wall portion, (d) said cylindrical wall having deformed portions engaging said resilient washer to secure said washer against rotation relative to said nut member, said washer having a central opening of smaller diameter than the major diameter of said bore, said screw being threadedly received in said opening from said one end, and (e) the central portion of said washer being resiliently and angularly displaced from a relatively flat condition toward said frusto-conical wall by the application of axial force on said washer by said screw, said washer tending to return to said flat condition and exerting thereby a constrictive component of force on said screw.

References Cited in the file of this patent

UNITED STATES PATENTS

| | | |
|---|---|---|
| 1,367,151 | Kraft | Feb. 1, 1921 |
| 1,729,013 | Rennerfelt | Sept. 24, 1929 |
| 2,222,460 | Crowley | Nov. 19, 1940 |
| 2,400,348 | Greene | May 14, 1946 |
| 2,487,129 | Hallock | Nov. 8, 1949 |